United States Patent [19]
Bridges et al.

[11] Patent Number: 6,081,860
[45] Date of Patent: Jun. 27, 2000

[54] ADDRESS PIPELINING FOR DATA TRANSFERS

[75] Inventors: Jeffrey Todd Bridges, Raleigh; Juan Guillermo Revilla, Cary; Thomas Andrew Sartorius, Raleigh; Mark Michael Schaffer, Cary, all of N.C.

[73] Assignee: International Business Machines Corporation, Armonk, N.Y.

[21] Appl. No.: 08/975,545

[22] Filed: Nov. 20, 1997

[51] Int. Cl.⁷ .................................................. G06F 13/00
[52] U.S. Cl. ........................... 710/110; 710/107; 710/112; 710/113; 710/240; 710/241; 710/4; 710/21; 710/27; 712/31; 711/150; 711/151; 711/156; 711/168; 711/169
[58] Field of Search .................................... 710/110, 107, 710/112, 113, 240, 241, 4, 21, 27; 711/150, 151, 156, 168, 169; 712/31

[56] References Cited

U.S. PATENT DOCUMENTS

| | | | |
|---|---|---|---|
| 4,038,644 | 7/1977 | Duke et al. | 710/107 |
| 4,253,147 | 2/1981 | MacDougall et al. | 711/169 |
| 4,384,323 | 5/1983 | Ahuja | 710/241 |
| 4,654,778 | 3/1987 | Chiesa et al. | 711/151 |
| 4,729,090 | 3/1988 | Baba | 710/107 |
| 5,099,419 | 3/1992 | Nomura | 395/375 |
| 5,131,085 | 7/1992 | Eikill et al. | 710/110 |
| 5,388,232 | 2/1995 | Sullivan et al. | 395/325 |
| 5,410,670 | 4/1995 | Hansen et al. | 395/425 |
| 5,455,912 | 10/1995 | Ludwig | 710/113 |
| 5,469,544 | 11/1995 | Aatresh et al. | 395/290 |
| 5,553,310 | 9/1996 | Taylor et al. | 395/860 |
| 5,603,052 | 2/1997 | Chejlava, Jr. et al. | 395/824 |
| 5,630,096 | 5/1997 | Zuravleff et al. | 711/154 |
| 5,649,209 | 7/1997 | Umetsu et al. | 710/266 |
| 5,793,994 | 8/1998 | Mitchell et al. | 710/126 |
| 5,911,052 | 6/1999 | Singhal et al. | 710/113 |
| 5,925,118 | 7/1999 | Revilla et al. | 710/110 |

FOREIGN PATENT DOCUMENTS

| | | | |
|---|---|---|---|
| 0690382 | 3/1996 | European Pat. Off. | G06F 12/02 |

OTHER PUBLICATIONS

IBM Technical Disclosure Bulletin, V. 34, No. 1, Jun. 1991 "Fixed–Length Pipelined–Bus–Protocol for Snoop Cache".

IBM Technical Disclosure Bulletin, V. 37, No. 06A, Jun. 1994 "Address Pipelining with a Flexible Control Mechanism for Shared Bus Protocols".

*Primary Examiner*—Ayaz R. Sheikh
*Assistant Examiner*—Frantz Blanchard Jean
*Attorney, Agent, or Firm*—John D Flynn; Robert V Wilder

[57] ABSTRACT

A process and system for transferring data including at least one slave device connected to at least one master device through an arbiter device. The master and slave devices are connected by a single address bus, a write data bus and a read data bus. The arbiter device receives requests for data transfers from the master devices and selectively transmits the requests to the slave devices. The master devices and the slave devices are further connected by a plurality of transfer qualifier signals which may specify predetermined characteristics of the requested data transfers. Control signals are also communicated between the arbiter device and the slave devices to allow appropriate slave devices to latch addresses of requested second transfers during the pendency of current or primary data transfers so as to obviate an address transfer latency typically required for the second transfer. The design is configured to advantageously function in mixed systems which may include address-pipelining and non-address-pipelining slave devices.

15 Claims, 5 Drawing Sheets

ADDRESS PIPELINING FOR DATA TRANSFERS

RELATED APPLICATIONS

The present application is related to co-pending applications entitled "METHODS AND ARCHITECTURES FOR OVERLAPPED READ AND WRITE OPERATIONS", Application Ser. No. 08/729,555, assigned to the assignee of the present application and included herein by reference.

FIELD OF THE INVENTION

The present invention relates generally to information processing systems and more particularly to an improved device for processing data transfers in a computer system.

BACKGROUND OF THE INVENTION

Computer systems have historically included at least one main electronics enclosure which is arranged to have mounted therein a plurality of circuit boards. The circuit boards, in turn, typically include a large number of integrated circuits (ICs) or so called "chips". With continuing advances in circuit integration and miniaturization, more and more of the individual single purpose chips are being integrated into fewer "full function" chips which include more functionality in less space.

As chip densities continue to increase, more of the computer system functions such as audio, video, and graphics, which have heretofore been normally coupled to a processor at the card level, are now being integrated onto the same IC as the system processor. With this increase in the number of functions being combined in a single IC, the bandwidth requirements of on-chip busses have also increased. As a result, several "on-chip" bus architectures are being developed to address the bandwidth requirements of the new "system-on-a-chip" design.

In one such processor local bus or PLB architecture, the address transfers, the read transfers and the write transfers are decoupled from one another which allows for the overlapping of read and write data transfers. As a result a very high bandwidth is attained since two data transfers, i.e. a read data transfer and a write data transfer, can be performed simultaneously.

In such systems, the decoupling of the address, read and write data transfers is accomplished via the use of three separate busses and a unique transfer acknowledge signal for each bus. In addition to the transfer acknowledge signals, a pair of "transfer complete" signals are used to indicate the completion of data transfers across the read and write data busses. At the completion of a read data transfer, a "read complete" signal is asserted by the slave device to indicate to the arbiter that the current data transfer has been completed, and the bus is now available for a new data transfer. In response to the assertion of the read complete signal, the arbiter will allow the address for a new read data transfer to be presented to the slave devices.

Similarly, at the completion of a write data transfer, a "write complete" signal is asserted by the slave to indicate to the arbiter that the current data transfer has been completed and the bus is now available for a new transfer. In response to the assertion of the write complete signal, the arbiter will allow the address for a new write data transfer request to be presented to the slave devices.

Many memory controllers which are being designed to couple with PLB systems, are devices which have a large initial latency or access time for the first data access. With the current PLB architecture, the non-pipelined nature of the address bus does not allow for the overlap of the initial access latency with a previous data transfer in the same direction. For example, in a given system, a memory controller is attached to an SDRAM memory which may have an initial access of six clock cycles. The memory controller in the example is designed such that while one bank of SDRAM is being accessed, a second access can be started in order to reduce the initial latency associated with waiting for the first access to be completed. With the current PLB architecture, when there are two back-to-back requests to read a word of data, the address valid (AValid) signal for the second read transfer is not asserted until the read complete (RdComp) signal is asserted for the first read transfer, indicating that the first read transfer will complete in the following cycle. Thus the second read transfer from the memory controller is not started until the cycle following the assertion of the RdComp signal for the first read transfer. Due to the pipelined nature of an SDRAM memory device, if the AValid signal, the address bus, and the transfer qualifiers for the second read transfer had been asserted in the cycle following the AValid for the first read transfer, then the initial latency for the second read transfer could have been overlapped with the initial latency or data transfer for the first transfer thus improving the overall performance of the system in accomplishing the data transfers.

However, if a second read request is presented to the memory controller prior to the memory controller transferring all of the data for the first read request, then a way is required for the memory controller to guarantee that the memory controller will complete the transfer of data for the first and second requests in the order in which the requests were presented. Furthermore, if a second read request is presented to a second memory controller on the PLB prior to the first memory controller transferring all of the data for the first read transfer, then a way to prevent a collision between the data being transferred by the first controller and the data being transferred by the second controller must also be provided since data for both transfers must share the use of the one PLB read data bus.

Accordingly, there is a need for an enhanced method and processing apparatus which is effective to allow for address pipelining for both read and write operations on a PLB bus system.

SUMMARY OF THE INVENTION

A method and apparatus is provided which is effective for enabling an arbiter device to accomplish address pipelining for both read and write operations between master and slave devices on a processor local bus (PLB). The methodology is compatible with existing PLB master and slave devices which do not support address pipelining. In accordance with one embodiment, a primary address valid signal is provided by an arbiter to slave devices in response to data transfer request from a master device to indicate when a common slave data bus is available and not currently being used to transfer a previous data request. When the slave data bus is being used, a secondary address valid signal is provided by the arbiter to so indicate. Address pipelining slave devices detect the secondary address valid signal, and decode and latch-in the address associated with the second request, and provide an acknowledge signal indicating that the secondary address has been latched and the slave address bus is available. The requested data is not transferred however, until a predetermined number of cycles after a generation of a read or write primary signal. The read or write primary signal is generated at a predetermined time increment prior to the completion of a current read or write data operation. If a third or subsequent data transfer request is requested by a master and received by the arbiter device while the read bus or write bus is busy performing the first request, and the second request has already been acknowledged, neither the primary address valid nor the secondary address valid signals will be asserted by the arbiter device in the illustrated example, and the third request will wait until the primary request has been completed. Upon completion of the transfer in accordance with the primary request, the second data transfer request will become the primary request and the slave device addressed by the second data transfer request will begin to transfer the requested data in the cycle following the completion of the transfer of the data requested by the first data transfer request. At that time, the third data transfer request will become the secondary request and the address associated with the third request will be latched by the appropriate slave device thereby freeing-up the slave address bus as the cycle is repeated for subsequent data transfer requests.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
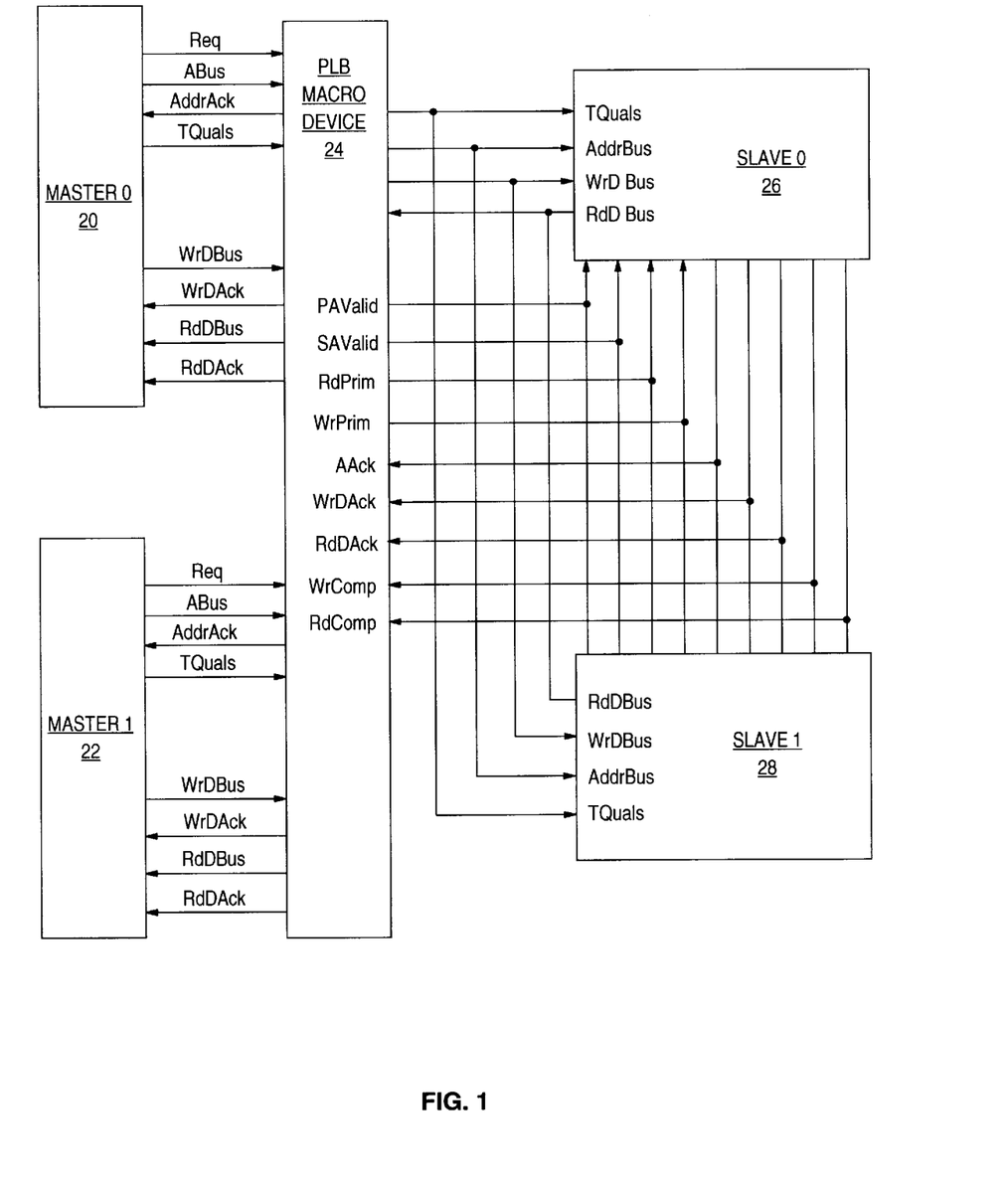
FIG. 1 is a simplified block diagram illustrating the configuration of an exemplary processor local bus or PLB architecture including the read and write pipelining enhancement disclosed herein.

With reference to FIG. 1, a simplified schematic diagram of a processor local bus (PLB) system is illustrated in which an exemplary embodiment of the present invention may be implemented. The illustration shows the major components of an exemplary system sufficient to enable a thorough understanding of the present invention, and non-material circuit details have been omitted in order not to obfuscate the presentation and understanding of the concepts herein presented. Although the present example describes a bus architecture as it relates to a PLB system, it is noted that the present invention applies to other systems as well.

As will be appreciated by one of skill in the art, the present invention may be embodied as a method or information processing system. Accordingly the present invention may take the form of an entirely hardware embodiment including a combination of hardware devices, an entirely software embodiment including a combination of functions or software devices, or an embodiment combining and including both hardware and software devices. Accordingly, in the following description, although for the most part the term "device" is used to refer to a hardware example, it is understood that the terms "device" and "function" may be used interchangeably in describing an exemplary embodiment of the present invention whether implemented in hardware or software.

The present disclosure illustrates and describes an enhancement to a processor local bus or PLB architecture, that will allow for address pipelining for both read and write operations on the bus. The exemplary PLB implementation consists of a PLB Arbiter Device 24 to which all master devices and slave devices are attached. The logic within the PLB arbiter 24 will consist of a central bus arbiter and the necessary bus control and gating logic functions. As shown in the exemplary embodiment illustrated in FIG. 1, first and second master devices 20 and 22, respectively, are connected to the PLB Arbiter Device 24. The example also shows first and second slave devices 26 and 28, respectively, also connected to the arbiter 24. The circuits illustrated in FIG. 1 may all be interconnected on a single integrated circuit or "chip".

Each master device is connected to the PLB arbiter device 24 by its own set of busses and control signals. Each master device 20 and 22, which are herein also referred to as "M0" and "M1", respectively, has a corresponding request line M0Req and M1Req to the arbiter 24. The master function or device asserts the request line to notify the arbiter 24 of a request for a read or write operation. Each master 20 and 22 also has corresponding address busses (M0ABus and M1ABus), write data busses (M0WrDBus and M1WrDBus), read data busses (M0RdDBus and M1RdDBus) and transfer qualifier signal busses (M0TQuals and M1TQuals) connecting the respective master devices M0 and M1 to the arbiter device 24. The master functions M0 and M1 transmit the initial address on the address bus (M0ABus and M1ABus) and the transfer qualifiers (M0TQuals and M1TQuals) while the request is asserted and until the master function asserting the request receives an acknowledge signal (M0AddrAck or M1AddrAck) from the arbiter 24. The master functions 20 and 22 may also transmit the write data on the write data bus (M0WrDBus and M1WrDBus) when the request is asserted if the operation requested is a write operation. The master functions 20 and 22 also receive read data acknowledge (M0RdDAck and M1RdDAck) and write data acknowledge signals (M0WrDAck and M1WrDAck) from the arbiter device 24.

The slave devices 26 and 28 are interconnected to each other and to the arbiter device 24 by a single address bus AddrBus. The slave devices 26 and 28 are also connected to each other and to the arbiter device 24 by a write data bus (WrDBus) and also a separate read data bus (RdDBus). The slave devices or functions 26 and 28 also receive a group of signals referred to herein as transfer qualifier signals or "TQuals" which include information regarding a data transfer such as whether the transfer address on the address bus is a read or a write transfer, the size of the transfer, the type of the transfer (e.g. byte aligned, line or burst), byte enables for the transfer, the priority or order for the transfer, and speculative memory access information or other information concerning a particular transfer. One detailed example of a transfer qualifier is provided in commonly assigned U.S. patent application Ser. No. 0/8731,350, entitled METHOD AND APPARATUS FOR CONTROL OF SPECULATIVE MEMORY ACCESSES, (Attorney Docket No. RA9-96-065), the disclosure of which is incorporated herein by reference. Because the transfer qualifier information is provided to the slave functions, multiple cycle transfers may be initiated with a single address, For example, by providing an initial address to a slave device and providing the type of transfer and number of bytes to be transferred, a block of data may be transferred to or from the slave device or function, over multiple cycles on the data busses with only a single address placed on the address bus.

The slave devices 26 and 28 are also connected to the arbiter 24 by a series of control signals. The control signals include a primary address valid signal (PAValid). The slave functions 26 and 28 also drive an address acknowledge signal AAck to the arbiter 24 when a slave function receives an address within the range of addresses assigned to the slave device. The slave device receiving data from the WrDBus also asserts a write data acknowledge signal (WrDAck) for each cycle of data properly received by the slave. During the last cycle of valid data on the WrDBus, the slave function asserts a write complete signal (WrComp) to indicate the final cycle of the transfer.

In a similar manner, the slave device or function placing read data on the RdDBus asserts a read data acknowledge signal (RdDAck) for each cycle of valid data on the RdDBus. The slave function also asserts a read complete signal (RdComp) on either the last or the second to last cycle of the transfer. Whether RdComp is asserted on the last cycle or the second to last cycle is dependent upon whether the slave function is utilizing an early read complete protocol. Because of the latency of a read operation, the slave function performing a read operation and utilizing an early read complete protocol may signal completion of the operation on the cycle prior to the completion of the read operation, with the advance time equal to the latency of the slave functions. Thus if it takes a slave function one cycle after receiving an address to drive data on the RdDBus (which represents the latency period of the slave function), then the slave function may indicate completion of the read operation one cycle early without the possibility of collision of data on the read data bus.

The disclosed implementation includes several new PLB signals for implementing the address pipelining function disclosed herein. Such signals include a "Secondary Address Valid" signal (SAValid), a "Read Secondary to Primary Indicator" signal (RdPrim), and a "Write Secondary to Primary Indicator" signal (WrPrim). The PAValid signal is asserted by the PLB arbiter 24 to indicate to the PLB slaves 26 and 28, herein also referred to as S0 and S1, respectively, that there are valid primary address and transfer qualifiers on the PLB bus. A primary request is one in which there are no data transfers outstanding on the data bus which the request requires. Therefore, after a slave device asserts an AAck signal, in response to a PAValid signal, the slave device may assert its data acknowledge signal and drive the data bus without regard for any outstanding transfers on the same bus. The data cannot be driven on the read data bus until two cycles following the address acknowledge.

The SAValid signal is a new PLB signal and will be asserted by the PLB arbiter 24 to indicate to the PLB slaves that there are secondary address and transfer qualifiers on the PLB bus. A secondary request is one in which the address and transfer qualifiers may be acknowledged by a slave device but the slave is not allowed to drive data acknowledge or the data bus. This allows a slave device to latch-up a secondary address and start a second transfer while a primary transfer is in progress. The slave must continue to wait to assert the data acknowledge and data bus until the PLB arbiter indicates that the bus is available by asserting the RdPrim or WrPrim signals.

The Read Secondary to Primary Indicator signal RdPrim is asserted by the PLB arbiter 24 to indicate to the PLB slaves 26 and 28 that a secondary transfer on the Read Data Bus, which has already been address acknowledged, may now be considered a "primary" transfer on the Read Data Bus. When the PLB slave asserts the RdComp signal for the primary request, the PLB arbiter 24 will then assert the RdPrim signal in the same cycle. The slave device which acknowledged the secondary transfer may now assert its first data acknowledge two cycles following the assertion of the RdPrim. If there is not a secondary request on the PLB or the secondary request has not been acknowledged by a PLB slave, then the RdPrim signal will not be asserted.

The Write Secondary to Primary Indicator signal WrPrim is asserted by the PLB arbiter 24 to indicate to the PLB slaves that a secondary transfer on the Write Data Bus, which has already been address acknowledged, may now be considered a primary transfer on the Write Data Bus. When the PLB slave asserts the WrComp signal for the primary request, The PLB 24 will then assert the WrPrim signal in the same cycle. The slave device which acknowledged the secondary transfer may now assert its first data acknowledge in the cycle following the assertion of the WrPrim. If there is not a secondary request on the PLB or the secondary request has not been acknowledged by a PLB slave, then the WrPrim signal will not be asserted. Examples of the PLB signals, along with several additional operational signals, are illustrated in FIG. 2 through FIG. 5 during various read and write operations.

Figure 2:
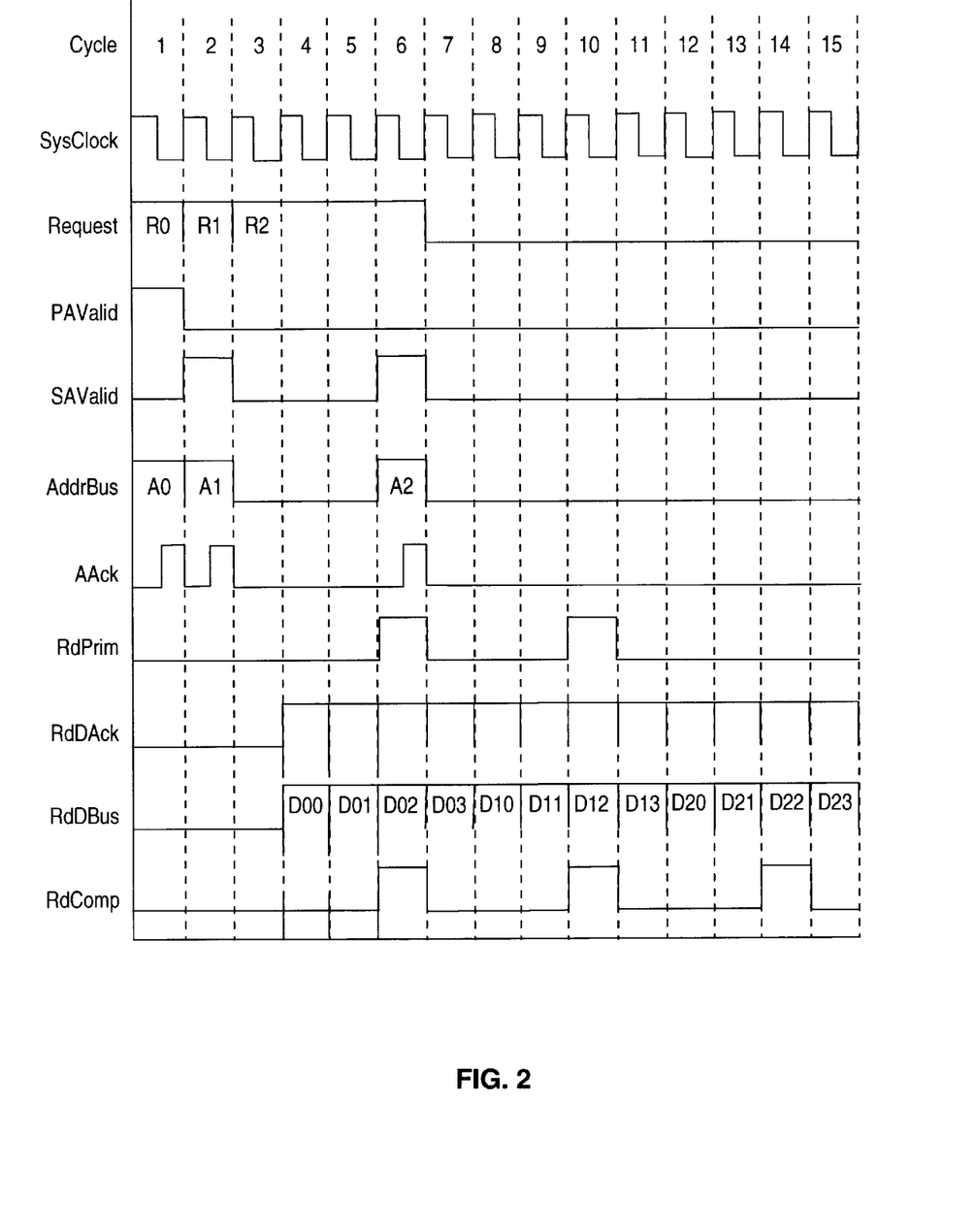
FIG. 2 is a timing diagram illustrating various signal relationships during an execution of three back-to-back line read requests to a slave unit which supports maximum address pipelining allowed on the PLB.

In FIG. 2, there is shown a timing diagram illustrating various signal relationships during an execution of three back-to-back line read requests to a slave unit which supports maximum address pipelining allowed on the PLB. The requests may be from the same master or from different masters. Also, the transfers could be to the same slave or different slaves, and the timing will remain the same. In an exemplary operation, a read transfer is requested by a master device in cycle 1 by asserting a Request signal. In response, the PLB arbiter 24 asserts a PAValid signal to the slave devices 26 and 28 since the read bus is idle in the FIG. 2 example. The slave devices 26 and 28 then decode the addresses presented on the address bus and the addressed slave device then asserts an AAck signal to indicate that it has latched the AddrBus and TQuals signals and no longer requires use of the address bus. Since the exemplary request is a primary request, i.e. the primary address valid signal (PAValid) was asserted, the slave device that acknowledged the request may drive the read data (D00, D01, D02, D03) on to the read data bus (RdDBus) starting in cycle 4 and ending in cycle 7, without regard for any outstanding read data transfers. The first cycle in which the slave could drive data is cycle 3, however, due to the initial latency of the slave accessing the data, the slave is unable to drive the RdDBus with valid data until cycle 4.

Further in the FIG. 2 example, in cycle 2, a second read transfer is requested R1 by a master device, and at this time, since the read bus is now busy performing the first transfer in response to the first request R0, the PLB arbiter considers this second read transfer request R1 to be a "secondary" request and asserts the SAValid signal in response to the master's request. Only those slave units which support the address pipelining function disclosed herein, will receive the SAValid signal and, when asserted, will decode the AddrBus and TQuals signals and assert AAck to indicate that the addressed slave has latched the AddrBus and TQuals signals and no longer requires the use of the address bus. Since the second request R1 in this example is a secondary request (because an earlier or primary request R0 was being processed as indicated by the assertion of the SAValid signal, when the second request R1 was received), the slave that acknowledged the second request R1 will fetch the read data requested but will not drive the RdDAck or the RdDBus signals (D10, D11, D12, D13) until cycle 8 or two cycles following the assertion of the RdPrim signal.

In the FIG. 2 example, a third read transfer request R2 is requested by a master during cycle 3. In this case since the read bus is busy performing the first transfer (D00-D03), and a second transfer R1 has already been acknowledged with an AAck signal, neither the primary address valid signal (PAValid) nor the secondary address valid signal (SAValid) will be asserted by the PLB arbiter 24 at this time. Instead, the third request R2 must wait until the primary request is completed as indicated by the assertion of RdComp, and the secondary request R1 becomes the primary transfer in progress. In cycle 6, the slave that acknowledged the first transfer R0 asserts the read complete signal (RdComp), and that signal indicates to the arbiter 24 that the read data bus will be available for the secondary request (D10, D11, D12, D13) beginning with cycle 8. Thus the arbiter 24 asserts the read primary signal RdPrim to indicate to the slave device that acknowledged the second transfer R1, that the slave may drive the data bus starting in cycle 8. In addition, the arbiter 24 asserts the secondary address valid signal (SAValid) to indicate to the slave devices that another secondary request R2 is valid, and may be acknowledged by a slave device in cycle 6. Since the third request R2 is now a secondary request, the acknowledging slave device must wait before driving the RdDAck signal or RdDBus (D20) until cycle 12, i.e. two cycles following the assertion of the second read primary signal (RdPrim). Thus, in the manner disclosed above, by using address pipelining, three 4-word lines of data are transferred in 15 timing cycles in a pipelined read operation.

Figure 3:
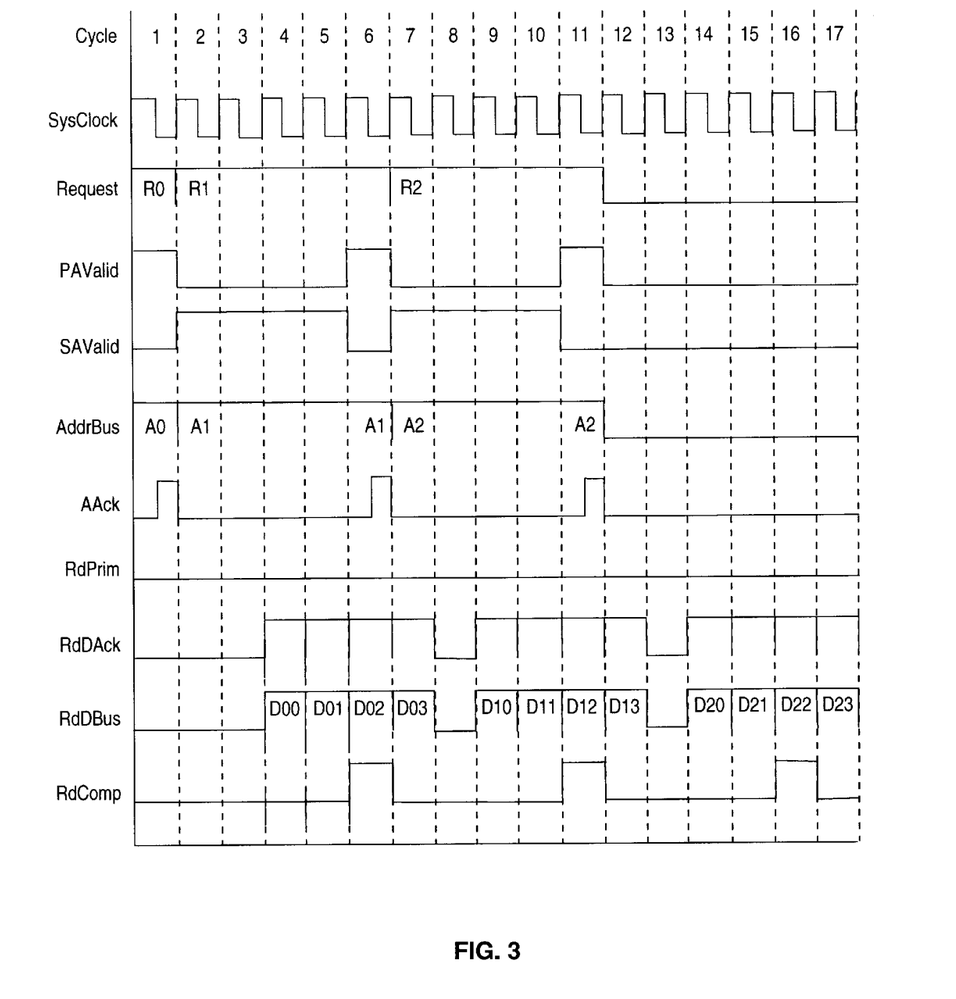
FIG. 3 is a timing diagram illustrating various signal relationships during an execution of three back-to-back line read requests to a slave unit which does not support read pipelining.

In FIG. 3 there is shown a timing diagram illustrating various signal relationships during an execution of three back-to-back line read requests to a slave unit which does not support read pipelining. As hereinbefore noted, such non-supporting slaves will ignore secondary transfer requests and the RdPrim signal is not generated. The timing and interrelationships of the signals in FIG. 3 will correspond to those illustrated in FIG. 2 except that there is no address pipelining function. The initial latency of each line access is not overlapped with the previous data transfer and there will be a one cycle delay between data transfers. This cycle delay is a result of the 3-cycle initial latency of the slave device. Since the slave does not support address pipelining in the FIG. 3 example, the slave does not latch the address for the subsequent transfer until PAValid is asserted. Thus, the 3-cycle initial latency is not overlapped with the previous data transfers. Accordingly, 17 cycles will be required to transfer three 4-word lines of data in a non-pipelined read operation.

Figure 4:
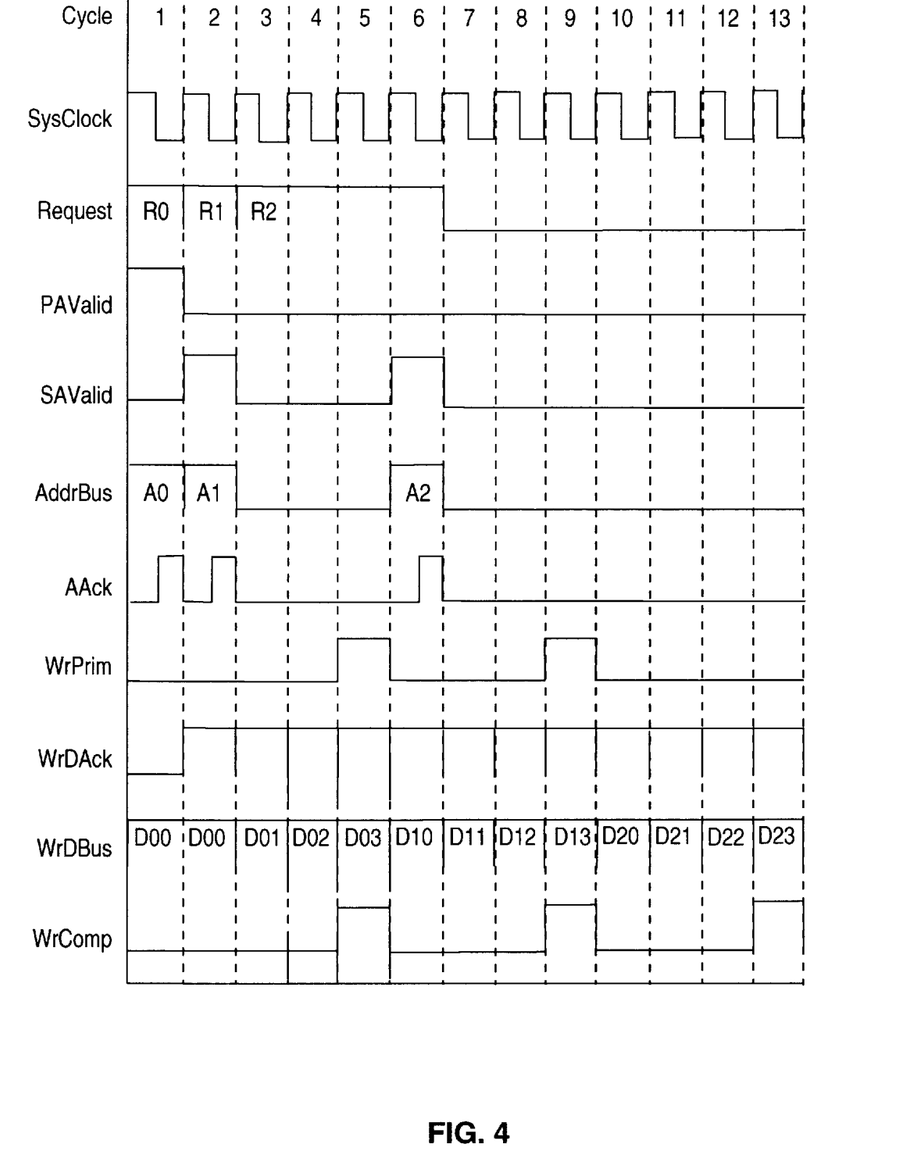
FIG. 4 is a timing diagram illustrating various signal relationships during an execution of three back-to-back line write requests to a slave unit which supports the maximum address pipelining allowed on the PLB.

In FIG. 4, there is shown a timing diagram illustrating various signal relationships during an execution of three back-to-back line write requests to a slave unit which supports the maximum address pipelining allowed on the PLB. The requests may be from the same master or from different masters. Also, the transfers could be from the same slave or from different slaves, and the timing will remain the same. In an exemplary operation, a write transfer is requested by a master device in cycle 1 by asserting a Request signal. In response, the PLB arbiter 24 asserts a PAValid signal to the slave devices 26 and 28 since the write bus is idle in the FIG. 4 example. The slave devices 26 and 28 then decode the addresses presented on the address bus and the addressed slave device then asserts an AAck signal to indicate that it has latched the AddrBus and TQuals signals and no longer requires use of the address bus. The master device is required to drive the write data bus with the first word of data during the request cycles. The PLB arbiter will gate the write data to the slaves when the PAValid or SAValid signals are asserted. The slave will assert the WrDAck signal to indicate that it has latched the data and that the master may now drive the next word of data. The write data for the first request is driven on the write data bus (WrDBus) starting in cycle 1 and ending in cycle 6. The first word of data is driven for 2 cycles on the WrDBus due to the initial latency of the slave device.

Still referring to the FIG. 4 example, in cycle 2, a second write transfer is requested R1 by a master device, and at this time, since the write bus is now busy performing the first transfer in response to the first request R0, the PLB arbiter considers this second write transfer request R1 to be a "secondary" request and asserts the SAValid signal in response to the master's request. Only those slave units which support the address pipelining function disclosed herein, will receive the SAValid signal and, when asserted, will decode the AddrBus and TQuals signals and assert AAck to indicate that the addressed slave has latched the AddrBus and TQuals signals and no longer requires the use of the address bus. Since the second request R1 in this example is a secondary request (because an earlier or primary request R0 was being processed as indicated by the assertion of the SAValid signal, when the second request R1 was received), the slave that acknowledged the second request R1 will not drive the WrDAck signals and will not sample the WrDBus signals (D10, D11, D12, D13) until cycle 6 or one cycle following the assertion of the Write Primary signal (WrPrim). Since the address was acknowledged in cycle 2 by the slave, the initial latency of this secondary request was overlapped with the write data transfer in progress.

When a third write transfer request R2 is requested by a master during cycle 3, since the write bus is busy performing the first transfer (D00–D03), and a second transfer R1 has already been acknowledged with an AAck signal, neither the primary address valid signal (PAValid) nor the secondary address valid signal (SAValid) will be asserted by the PLB arbiter 24 at this time. Instead, the third request R2 must wait until the primary request is completed as indicated by the assertion of WrComp, and the secondary request R1 becomes the primary transfer in progress. In cycle 5, the slave that acknowledged the first transfer R0 asserts the write complete signal (WrComp), and that signal indicates to the arbiter 24 that the write data bus will be available for the secondary request (D10, D11, D12, D13) beginning with cycle 6. Thus the arbiter 24 asserts the write primary signal (WrPrim) to indicate to the slave device that acknowledged the second transfer R1, that the slave may receive the data on the write bus starting in cycle 6. In addition, the arbiter 24 asserts the secondary address valid signal (SAValid) to indicate to the slave devices that another secondary request R2 is valid, and may be acknowledged by a slave device in cycle 6. Since the third request R2 is now a secondary request, the acknowledging slave device must wait before receiving the next data word D20–D23 until cycle 10, i.e. one cycle following the assertion of the second write primary signal WrPrim. Thus, in the manner disclosed above, by using address pipelining, three 4-word lines of data are transferred in a pipelined write operation in 13 timing cycles. In this example, the initial 2-cycle latency for the second and third write transfer is overlapped with the previous write data transfer thereby allowing full utilization of the write data bus.

Figure 5:
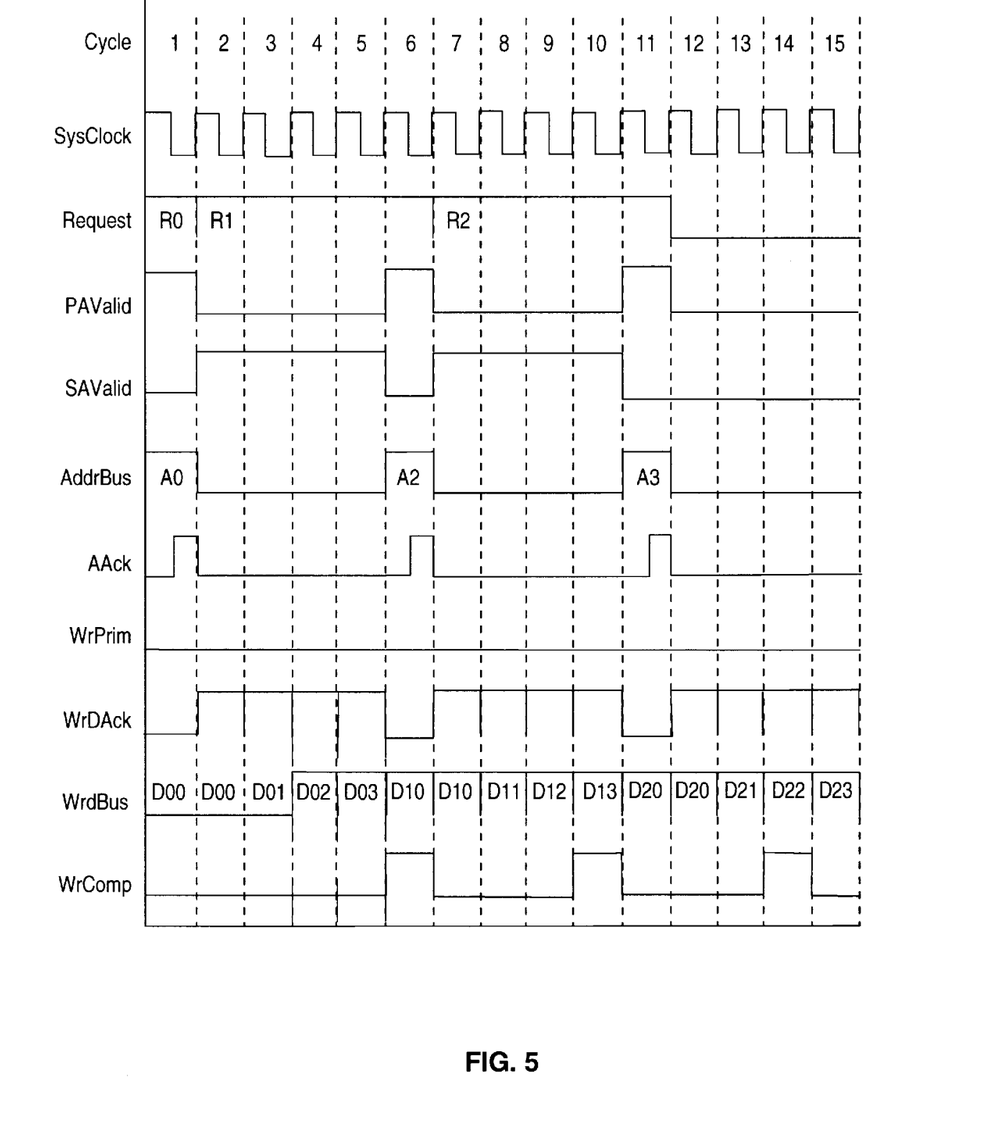
FIG. 5 is a timing diagram illustrating various signal relationships during an execution of three back-to-back line write requests to a slave unit which does not support the maximum address pipelining allowed on the PLB.

In FIG. 5, there is shown a timing diagram illustrating various signal relationships during an execution of three back-to-back line write requests to a slave unit which does not support the maximum address pipelining allowed on the PLB. The requests may be from the same master or from different masters. Also, the transfers could be from the same slave or from different slaves, and the timing will remain the same. As hereinbefore noted, such non-supporting slaves will ignore secondary transfer requests and the WrPrim signal is not generated. The timing and interrelationships of the signals in FIG. 4 will correspond to those illustrated in FIG. 3 except that there is no address pipelining function. Without address pipelining, the initial latency for each line transfer is not overlapped with the previous transfer. Accordingly, there will be a one cycle delay between data transfers and 15 cycles will be required to transfer three 4-word lines of data in a non-pipelined write operation.

Thus the present invention improves the bandwidth of the bus when performing transfers that have a long initial latency. The pipelining enhancement allows the attachment of existing non-pipelined slaves without any changes required of those slave devices. Also, masters may be designed without knowledge of the pipeline capability of the slave device and will be capable of transferring data to pipelined and non-pipelined slave devices.

The method and apparatus of the present invention has been described in connection with a preferred embodiment as disclosed herein. Although an embodiment of the present invention has been shown and described in detail herein, along with certain variants thereof, many other varied embodiments that incorporate the teachings of the invention may be easily constructed by those skilled in the art, and included or integrated into a processor or CPU or other larger system integrated circuit or chip. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for pipelining addresses associated with a plurality of data transfer requests, said data transfer requests comprising two or more read requests or two or more write requests, said method comprising:

receiving a first data transfer request during a first operational cycle for a first data transfer over a data bus with a first device;

storing a first address of said first device;

generating a first address acknowledge signal representative that said first address has been stored;

initiating said first data transfer;

receiving a second data transfer request for a second data transfer over said data bus, said second data transfer request being received during a second operational cycle;

storing a second address of a device associated with said second data transfer request before said first data transfer has completed;

generating a second address acknowledge signal representative that said second address has been stored, said second address acknowledge signal being generated prior to a completion of said first data transfer; and initiating said second data transfer in response to said second data transfer request in a cycle immediately following a completion of said first data transfer whereby said second data transfer occurs on said data bus after said first data transfer without any intervening cycle times between said first data transfer and said second data transfer.

2. The method as set forth in claim 1 wherein said first and second data transfer requests are processed by an arbiter device connected between at least one master device and at least one slave device, said method further including:

receiving a first request for a first data transfer over a data bus, said first request being received during an idle status of said data bus, said first request being associated with a first target address presented on an address bus;

generating a first request status indicia representative of an idle status of the data bus in transferring data;

storing said first target address by a slave device;

generating a first request acknowledge signal to indicate said slave device storing of said first target address;

driving said data bus with data pursuant to said first request;

generating a first completion signal to indicate a completion by said slave device of data transfers associated with said first request;

receiving a second request for a second data transfer, said second request being received prior to said generating of said first completion signal, said second request being associated with a second target address presented on said address bus;

generating a second request status indicia representative of a busy status of said data bus in transferring data;

storing said second target address by a slave device prior to said generating of said first completion signal;

generating a second request acknowledge signal prior to said generating of said first completion signal to indicate said slave device storing of said second target address;

generating a request status transition signal to indicate a change in data bus status from busy to idle as a result of said generating of said first completion signal; and driving said data bus with data pursuant to said second request subsequent to said generating of said request status transition signal.

3. The method as set forth in claim 2 wherein the method is implemented within a synchronous data processing system.

4. The method as set forth in claim 1 and further including:

queuing data transfer requests subsequent to said second request and received during a busy status of said data bus for sequential data transfers over said data bus upon completion of each previous data transfer request without intervening address cycle latency.

5. The method as set forth in claim 4 wherein the method is implemented within a synchronous data processing system.

6. The method as set forth in claim 2 wherein said generating of said first and second request status indicia comprises:

providing a primary address valid signal when said data bus is in an idle status; and providing a secondary address valid signal when said data bus is in a busy status.

7. The method as set forth in claim 6 wherein the method is implemented within a synchronous data processing system.

8. The method as set forth in claim 1 wherein said first and second data transfer requests are data read requests.

9. The method as set forth in claim 8 wherein the method is implemented within a synchronous data processing system.

10. The method as set forth in claim 1 wherein said first and second data transfer requests are data write requests.

11. The method as set forth in claim 10 wherein the method is implemented within a synchronous data processing system.

12. The method as set forth in claim 2 wherein said generating of said request status transition signal comprises providing a read primary signal when said first and second requests are read requests, and providing a write primary signal when said first and second requests are write requests.

13. The method as set forth in claim 12 wherein the method is implemented within a synchronous data processing system.

14. The method as set forth in claim 1 wherein the method is implemented within a synchronous data processing system.

15. A data transfer system comprising:
- a master device;
- a slave device;
- a data bus coupled between said master device and said slave device; and
- an arbiter device coupled to said master device and said slave device, said data transfer system being operable for pipelining addresses associated with a plurality of data transfer requests, said data transfer requests comprising two or more read requests or two or more write requests, said data transfer system being further selectively operable for:

receiving a first data transfer request during a first operational cycle for a first data transfer over said data bus between said master device and said slave device;

storing a first address of said slave device;

generating a first address acknowledge signal by said slave device representative that said first address has been stored;

initiating said first data transfer between said master device and said slave device;

said arbiter device receiving a second data transfer request for a second data transfer over said data bus, said second data transfer request being received during a second operational cycle;

storing an address of a device associated with said second data transfer before said first data transfer has completed;

generating a second address acknowledge signal representative that said second address has been stored, said second address acknowledge signal being generated prior to a completion of said first data transfer; and initiating said second data transfer in response to said second data transfer request in a cycle next following a completion of said first data transfer whereby said second data transfer occurs on said data bus after said first data transfer without any intervening cycle times between said first data transfer and said second data transfer.

* * * * *